F. A. & R. MOFFITT.
AUTOMOBILE SLEIGH RUNNER.
APPLICATION FILED MAR. 20, 1917.
1,275,721.
Patented Aug. 13, 1918.
2 SHEETS—SHEET 1.
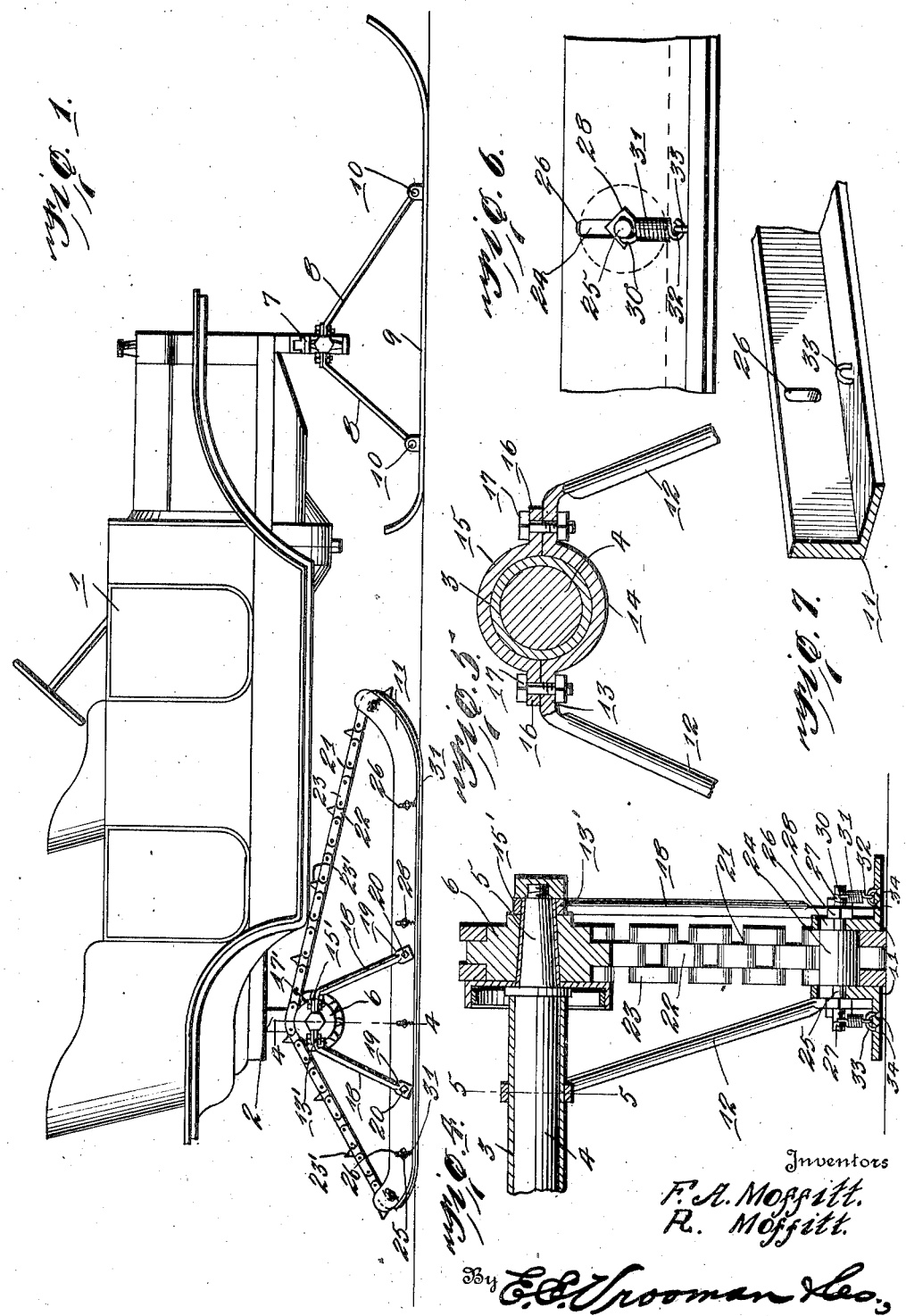
Inventors
F. A. Moffitt.
R. Moffitt.
By E. S. Trooman Leo.,
their Attorneys F. A. & R. MOFFITT.
AUTOMOBILE SLEIGH RUNNER.
APPLICATION FILED MAR. 20, 1917.
1,275,721.
Patented Aug. 13, 1918.
2 SHEETS—SHEET 2.
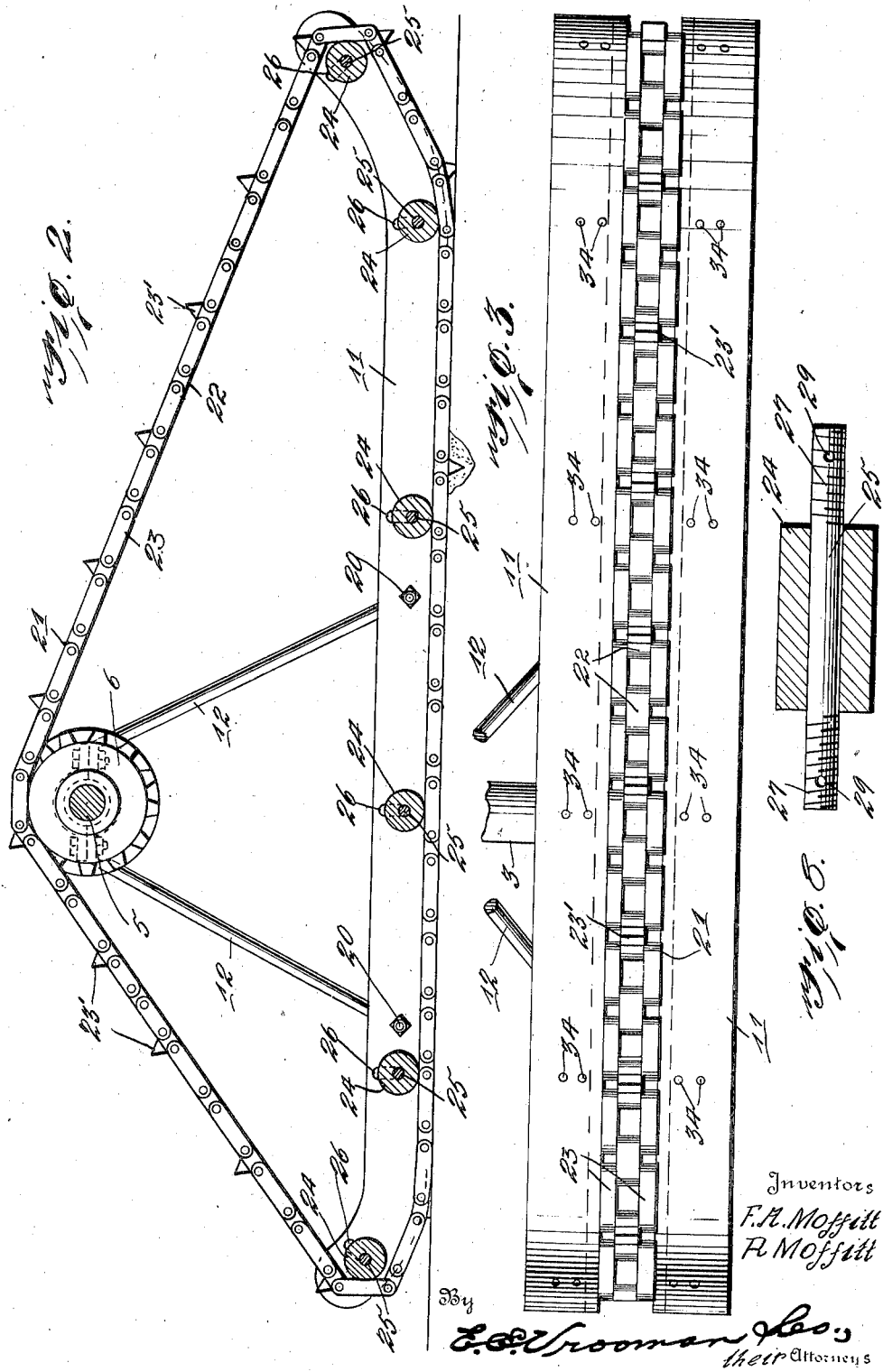
Inventors
F. A. Moffitt
R. Moffitt
By
their Attorneys

UNITED STATES PATENT OFFICE.

FLOYD A. MOFFITT AND ROSS MOFFITT, OF ALBION, MICHIGAN.

AUTOMOBILE-SLEIGH RUNNER.

1,275,721.  Specification of Letters Patent.  Patented Aug. 13, 1918.

Application filed March 20, 1917. Serial No. 156,155.

*To all whom it may concern:*

Be it known that we, FLOYD A. MOFFITT and ROSS MOFFITT, citizens of the United States of America, residing at Albion, in the county of Calhoun and State of Michigan, have invented certain new and useful Improvements in Automobile-Sleigh Runners, of which the following is a specification, reference being had therein to the accompanying drawing.

This invention relates to an automobile sleigh runner and has for its principal object the production of a simple and efficient means for propelling a sleigh.

Another object of this invention is the production of an automobile sleigh runner wherein each runner is provided with a chain extending longitudinally thereof and normally projecting from below so as to cause the runner to carry the weight of the sleigh although the chain will bite into the snow or ice for propelling the sleigh as the chain is moving in a desired direction.

Another object of this invention is a production of an automobile sleigh runner wherein each runner is divided so as to permit an endless chain to pass therethrough, the chain being normally urged below the lower portions of the runner by yieldable means, whereby the chain will bite into the snow for propelling the sleigh as the chain is moved, although the yieldable means will permit the chain to move within the surface of the lower portion of the runner when the same is passing over an uneven surface such as ice, thereby preventing the chain from leaving or jolting the sleigh under such conditions.

With these and other objects in view, this invention consists of certain novel constructions, combinations and arrangements of parts as will be hereinafter fully described and claimed.

In the drawings:

Figure 1 is a side elevation of the automobile sleigh runner showing the same in use.

Fig. 2 is a longitudinal section through the sleigh runner, showing the chain in elevation.

Fig. 3 is a bottom plan view of the sleigh runner.

Fig. 4 is a vertical section taken on the line 4—4 of Fig. 1.

Fig. 5 is a vertical section taken on line 5—5 of Fig. 4.

Fig. 6 is a fragmentary side elevation of one of the runners illustrating the means used for yieldably retaining the rollers in a set position.

Fig. 7 is a fragmentary detail perspective view of one section of one of the runners.

Fig. 8 is a sectional view through one of the rollers, showing the shaft in elevation.

Referring to the accompanying drawings by numerals, it will be seen that 1 designates an automobile having a suitable supporting member 2 carried in any desired manner upon the casing 3 of the rear axle 4. This rear axle 4 has a driving axle terminal 5 extending from its outer ends and upon each driving axle terminal 5 there is keyed in any suitable manner the sprocket 6, the purpose of which will be hereinafter fully disclosed and claimed. The forward end of the automobile 1 is provided with the usual spring supporting members 7 to which the braces 8 are connected, as shown in Fig. 1. An ordinary runner 9 is connected as indicated at 10 to the lower ends of the braces 8, thereby constituting a support for the forward end of the automobile inasmuch as it is obvious that a runner 9 is to be carried upon each side of the automobile.

The rear runner comprises a pair of sections 11, and each section is substantially L-shaped in cross-section as shown in Fig. 4. The inner section 11 of each rear runner is provided with slanting braces 12 which are connected at their upper ends as shown in Fig. 5 by means of the bridge 13. The bridge 13 is bowed as shown at 14 at its central portion so as to conform in contour to the shape of the casing 3. The clamp 15 is also positioned upon the casing 3 as shown in Fig. 5, so as to cause the outwardly extending ends 16 to rest upon the bridge 13. The bolts 17 extend through the ends 16 and through the bridge 13 for fixedly mounting the clamp upon the bridge. The outer braces 18 are connected to the outer sections of the rear runner and the upper ends of these outer braces mounted upon the outer end of the driving axle terminal 5 being retained by a bridge 13', a clamp 15' and bolts 17' in a manner similar to the way the inner braces 12 are retained in engagement with the casing 3.

It will be seen that the lower ends of the braces 12 and 18 are provided with plates 19 which fit snugly upon the respective sections 11 of the rear runner as shown in Figs. 1 and 4, thereby permitting the securing members 20 to pass through the plates 19 and the vertical portion of the L-shaped section for fixedly mounting this section upon the lower ends of the braces 12 and 18. Therefore, it will be seen that since the sections of the runners are carried at suitable distances below the axle 4, the rear end of the automobile will be sufficiently supported.

In order to propel the sleigh, there is provided an endless chain 21 composed of a plurality of inner links 22 and outer links 23 shown clearly in Figs. 3 and 4. These chains pass over the sprocket 6 carried at each end of the rear axle 4 so that when rotary motion is imparted to the sprocket 6 by the driving axle terminal 5 at each end of the axle 4, the chains will be driven. In order to hold the chains in yieldable engagement with the surface over which the sleigh is being driven, there are provided a plurality of rollers 24 mounted upon shafts 25. The vertical portion of each section 11 is provided with a plurality of vertical slots 26 as shown in Figs. 1 and 2, the slot of one section being formed in direct alinement with the slots of the remaining section of the particular runner. The ends of the shaft 25 of each roller project through a pair of slots as shown in Fig. 5 so as to permit the externally threaded ends 27 of the shafts 25 to receive the retaining nuts 28. These nuts 28 are secured upon the externally threaded ends 27 of the shafts 25 so as to bear slightly upon the outer surfaces of the section 11 for holding the shaft 25 from slipping through the rollers 24 which action would cause the shafts to disengage the rollers. The shafts 25 are also provided with openings 29 projecting therethrough, as shown in Fig. 8 so as to receive the hooked ends 30 of the coiled springs 31. The lower hooked ends 32 of the coil springs 31 engage loops 33 carried by the base of each section 11. These loops 33 have heads 34 formed upon their lower ends and connecting with the lower surface of the base of each section 11 of the runner. In this manner, it will be seen that the loops 33 will be fixedly retained upon the runner although the lower surfaces of the runner will be even or smooth throughout its entire length; inasmuch as the springs 31 are connected to the projecting ends of the shafts 25, the rollers 24 will be normally urged downwardly so as to bear upon the chains 21 for holding the chains in engagement with the surface over which the sleigh is passing.

When this device is in operation, it will be seen that as rotary motion is imparted to the sprockets, the chain will be driven; the tension of the springs 31 will cause the rollers 24 to urge the chains 21 to project below the lower surface of the sections 11 of each rear runner as shown in Figs. 1, 2 and 4. As a consequence, the movement of the chain will cause the chain to be driven since the chains project far enough below the sections of the rear runner to bite into the snow for driving or moving the automobile sleigh. If however, the sleigh passes over an uneven surface or over ice into which the chain will not bite, owing to the hardness of the surface, an additional pressure upon the chain will cause the particular roller or rollers upon which the additional pressure is brought to bear to move upwardly against the tension of a plurality of the coil springs 31. By yieldably holding the rollers in engagement with the chain so as to allow the movement above referred to, it will allow the sleigh to pass over such uneven or hard surfaces without jolting or jarring as would be the case if the rollers were permanently mounted upon the runner and not yieldably supported.

From the foregoing description, it will be seen that a very simple and efficient sleigh runner has been provided, wherein the spaced sections of each runner will permit the reception of a plurality of rollers, whereby the driving chain of each runner may fit upon the rollers so as to be held in engagement with snow or surfaces over which the sleigh is being driven. It is further obvious that when the rollers are carried slightly above the lower surfaces of the sections 11, a guiding space will be provided in which the chains will fit so as to be held upon the rollers. Furthermore, by yieldably supporting the rollers, the chains will be normally held in engagement with snow, although the chain may yield by the movement of the rollers when uneven or hard surfaces are encountered.

It will be seen that the links 23 of the chains are to be provided with biting lugs 23' extending downwardly therefrom as shown in Figs. 1, 2, and 3. As a consequence, these lugs will bite into the snow so as to keep the chains from slipping and as a consequence will cause the chains to easily propel the sleigh upon which the runners are to be carried. It is, of course, obvious that the number of lugs 23' may be increased or decreased and that they may be carried, if so desired, either upon the inner or outer lugs and furthermore, may be changed in shape to present a firmer grip action if so desired without departing from the spirit of this invention.

What is claimed is:

1. In a device of the class described, the combination of a runner, comprising a pair of spaced sections, means for attaching said runner to a stub axle, said sections being provided with alined slots, shafts projecting through said slots, rollers loosely mounted upon said shafts and spanning the distance between said sections, means carried upon the projecting ends of said shafts for holding the same from slipping through said rollers, coil springs connected to the ends of said shafts, means for connecting said coil springs to said sections, whereby said shafts will normally be urged downwardly, an endless chain passing around said rollers and projecting below the lower surface of said rollers, means for driving said chain and said rollers being adapted to move inwardly and allow the chain to move inwardly against the tension of said springs when the chain engages a hard surface.

2. In a device of the class described, the combination of a runner comprising a pair of sections, said sections being L-shaped in cross section, the upwardly extending portions of said sections having alined slots formed therein, means for attaching said runner to the axle of an automobile, shafts passing through said slots, rollers loosely mounted upon said shafts between said sections, loops fixedly mounted upon the horizontal portions of said sections, coil springs connected to the ends of said shafts and to said loops, whereby said axles will be normally urged downwardly, an endless chain bearing upon said rollers and projecting below the lower surface of said sections, thereby allowing the chain to grip a surface, means for driving said chain and said chain being adapted to move inwardly so as to move said rollers upwardly against the tension of said springs when the runner is passing over a hard surface thereby preventing the chain from jarring the runner.

3. In a device of the class described, the combination of a runner comprising a pair of spaced sections, means for attaching said runner to a driving axle terminal, said sections having alined slots, shafts projecting through said slots, rollers loosely mounted upon said shafts, nuts carried upon the projecting ends of said shafts, for holding said shafts against displacement, means for urging said shafts in one direction, an endless chain passing around said rollers, and means for driving said chain.

4. In a device of the class described, the combination of a runner comprising a pair of spaced sections, means for attaching said runner to a driving axle terminal, said sections having alined slots, shafts projecting through said slots, rollers loosely mounted upon said shafts, nuts carried upon the projecting ends of said shafts, for holding said shafts against displacement, springs carried by said sections and engaging said shafts for urging said shafts in one direction, an endless chain passing around said rollers and means for driving said chain.

5. In a device of the class described, the combination of a runner comprising a pair of sections, said sections being L-shaped in cross-section, the upwardly extending portions of said sections having alined slots formed therein, means for attaching said runner to a driving axle terminal, shafts passing through said slots, rollers loosely mounted upon said shafts between said sections, means for holding said shafts against displacement, means for urging said shafts in one direction, an endless chain passing around said rollers, and means for driving said chain.

6. In a device of the class described, the combination of a runner comprising a pair of sections, said sections being L-shaped in cross-section, the upwardly extending portions of said sections having alined slots formed therein, means for attaching said runner to a driving axle terminal, shafts passing through said slots, rollers loosely mounted upon said shafts, between said sections, means for holding said shafts against displacement, springs carried by said sections and engaging said shafts for urging said shafts in one direction, an endless chain passing around said rollers, and means for driving said chain.

7. In a device of the class described, the combination of a runner comprising a pair of sections, said sections being L-shaped in cross-section, the upwardly extending portions of said sections having alined slots formed therein, means for attaching said runner to a driving axle terminal, shafts passing through said slots, rollers loosely mounted upon said shafts between said sections, nuts carried by said shafts and bearing upon said sections, for holding said shafts against displacement, springs carried by said sections and engaging said shafts for urging said shafts in one direction, an endless chain positioned upon said rollers, and means for driving said chain.

In testimony whereof we hereunto affix our signatures.

FLOYD A. MOFFITT.
ROSS MOFFITT.